(12) United States Patent
Kitagawa et al.

(10) Patent No.: US 8,742,636 B2
(45) Date of Patent: Jun. 3, 2014

(54) TERMINAL BLOCK FOR ROTARY ELECTRIC MACHINE

(75) Inventors: Katsuhide Kitagawa, Seto (JP); Katsunori Ueki, Toyota (JP); Daisuke Akuta, Yokkaichi (JP); Hiroyuki Matsuoka, Yokkaichi (JP)

(73) Assignees: Toyota Jidosha Kabushiki Kaisha, Toyota-Shi (JP); Sumitomo Wiring Systems, Ltd., Tokkaichi (JP)

( * ) Notice: Subject to any disclaimer, the term of this patent is extended or adjusted under 35 U.S.C. 154(b) by 349 days.

(21) Appl. No.: 13/015,855

(22) Filed: Jan. 28, 2011

(65) Prior Publication Data

US 2011/0187213 A1   Aug. 4, 2011

(30) Foreign Application Priority Data

Jan. 29, 2010   (JP) ................................. 2010-018496
Jul. 5, 2010     (JP) ................................. 2010-153337

(51) Int. Cl.
*H02K 11/00*     (2006.01)
*H02K 5/24*      (2006.01)

(52) U.S. Cl.
USPC ............................................. 310/71; 310/51

(58) Field of Classification Search
USPC ..................................................... 310/71, 51
See application file for complete search history.

(56) References Cited

U.S. PATENT DOCUMENTS

| | | | |
|---|---|---|---|
| 6,455,962 B2 * | 9/2002 | Suzuki et al. | 310/71 |
| 7,010,972 B2 * | 3/2006 | Kozawa et al. | 73/204.22 |
| 7,373,815 B2 * | 5/2008 | Kozawa et al. | 73/204.22 |
| 7,455,552 B1 | 11/2008 | Fang et al. | |
| 8,441,160 B2 * | 5/2013 | Watanabe et al. | 310/71 |
| 2008/0048508 A1 * | 2/2008 | Shimoyama | 310/43 |
| 2009/0029594 A1 * | 1/2009 | Matsuoka | 439/626 |
| 2009/0124121 A1 * | 5/2009 | Matsuoka | 439/550 |
| 2010/0009566 A1 * | 1/2010 | Sakakura et al. | 439/364 |
| 2010/0181852 A1 * | 7/2010 | Kobayashi | 310/71 |
| 2011/0187213 A1 | 8/2011 | Kitagawa et al. | |

FOREIGN PATENT DOCUMENTS

| | | |
|---|---|---|
| EP | 2141778 A1 | 1/2010 |
| JP | 2004-028934 A | 1/2004 |
| JP | 2005-235443 A | 9/2005 |
| JP | 2008-301544 A | 12/2008 |
| JP | 2009117306 A * | 5/2009 |
| JP | 2011-177002 A | 9/2011 |

OTHER PUBLICATIONS

Translation of foreign document JP 2008301544 A.*

* cited by examiner

*Primary Examiner* — Tran Nguyen
*Assistant Examiner* — Alex W Mok
(74) *Attorney, Agent, or Firm* — Kenyon & Kenyon LLP

(57) ABSTRACT

A rotary electric machine terminal block fits into an opening of a case that contains a rotary electric machine, and is fixed to the case by a plate. The rotary electric machine terminal block has: a mount that is formed by fixing the electric power line connector and the signal line connector to the steel-made plate and performing insert molding so that an anti-vibration plate is formed on an upper surface of the plate; projected portions of the plate which each have a fixture hole for fixing the plate to the case; an edge seal member that covers an edge of the projected portion; a face seal member for tight attachment of the mount to the case; and two positioning pins.

8 Claims, 20 Drawing Sheets

FIG. 9
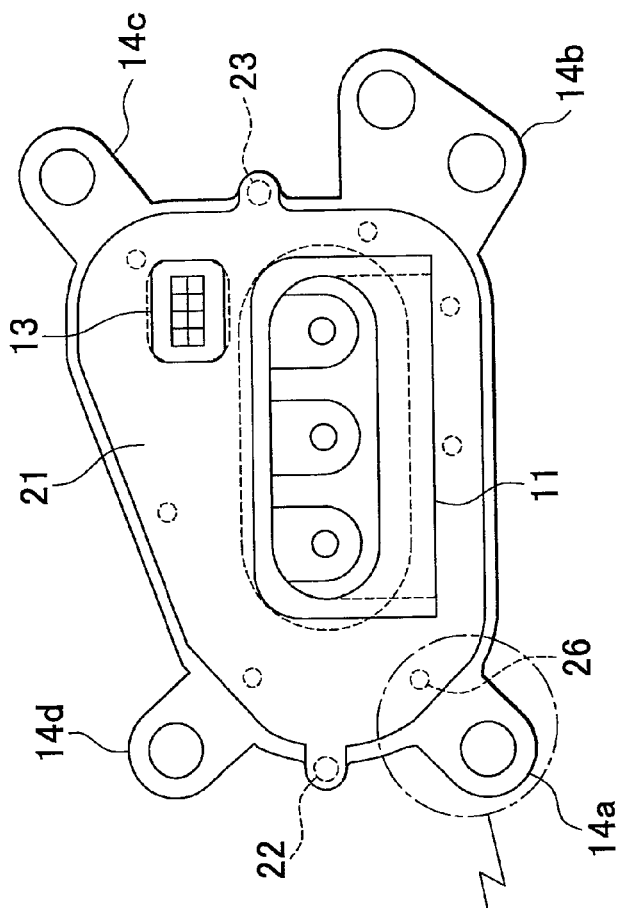
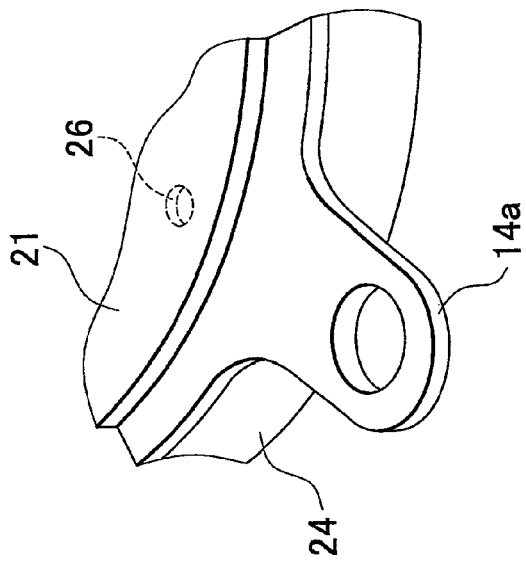
ENLARGED VIEW

TERMINAL BLOCK FOR ROTARY ELECTRIC MACHINE

INCORPORATION BY REFERENCE

The disclosure of Japanese Patent Applications No. 2010-018496 and 2010-153337 filed on Jan. 29, 2010 and Jul. 5, 2010, respectively, including the specifications, drawings and abstracts, is incorporated herein by reference in its entirety.

BACKGROUND OF THE INVENTION

1. Field of the Invention

The invention relates to a rotary electric machine terminal block provided on a transaxle case that contains a rotary electric machine. Particularly, the invention relates to a rotary electric machine terminal block whose size is reduced by adopting an insert molding process.

2. Description of the Related Art

There are generally known an electric motor vehicle propelled by electric power from a battery, a fuel cell motor vehicle propelled by electric power generated by a fuel cell, a hybrid motor vehicle propelled by a combination of an internal combustion engine and a rotary electric machine that functions as an electric motor or an electricity generator, etc. In these motor vehicles, electric power is supplied from a battery or the like to an electric motor under a control by an inverter for the purpose of propulsion of the motor vehicle. Furthermore, during braking, the battery is charged with regenerative electric power by causing an electric motor to function as an electricity generator. Besides, in the hybrid motor vehicle, if the state of charge of the battery becomes low, the battery can be charged by driving the electricity generator by using the internal combustion engine. Therefore, the hybrid motor vehicle does not require the battery charging operation which is essential to the electric motor vehicle, and actively uses the rotary electric machine that is an electric motor or an electricity generator.

In the hybrid motor vehicle, however, it is necessary to mount in limited spaces of the vehicle a battery as a vehicle propulsion electric power source, an inverter that supplies electric power from the battery to the rotary electric machine while controlling the electric power, a connection cable capable of feeding large current to the rotary electric machine, etc., in addition to substantially the same kinds of devices and the like as mounted in an ordinary engine-propelled motor vehicle. Therefore, size reduction of various appliances employed in the hybrid motor vehicle are being pursued more vigorously than in the engine-propelled motor vehicle. Besides, in the hybrid motor vehicle, since an engine, a rotary electric machine, a motive power distribution mechanism and a transmission mechanism are mounted as an integrated unit within a transaxle case (hereinafter, also referred to simply as "case"), the case is provided with a connector for connecting the rotary electric machine and the inverter.

In the hybrid motor vehicle, the voltage supplied to the rotary electric machine by the inverter is designed to be a high voltage of 500 volts or more, in order to improve the performance as an electric motor vehicle. Because of the use of such high voltage, it is necessary to provide a measure for reducing noise in high-voltage portions and a measure for preventing short-circuiting of the oil-cooled rotary electric machine, terminals and the like. Besides, the cable that connects the rotary electric machine and the inverter needs to be securely fixed to the case or the vehicle body in order to withstand vibration from the rotary electric machine or the cable. Therefore, for the cable that supplies high voltage, optimization of the shield coating, the water-proof coating, the cable layout and the method of fixation of the cable is pursued. The three-phase alternating-current power lines connected to the rotary electric machine are connected to a terminal block while a predetermined creepage distance is secured. Furthermore, a shield cover is provided to reduce the radiation of electromagnetic noise from the terminal block.

In particular, the terminal block, the cable connected to the terminal block, etc. are exposed to vibration that occurs during the traveling of the vehicle, and therefore need anti-vibration measures. Therefore, Japanese Patent Application Publication No. 2005-235443 (JP-A-2005-235443) describes a fixation structure for a connector which is capable of absorbing vibration from a cable. This connector fixation structure is provided for the connection between a first connector provided on a vehicle-mounted case that houses a rotary electric machine and the like, and a second connector provided on a cable that is to be connected to the first connector. More specifically, the connector fixation structure is provided for fixing the second connector. Besides, in this connector fixation structure, the cable is fixed by using a clamp that absorbs vibration from the cable. However, the first and second connectors described in JP-A-2005-235443 are electric power supply line connectors. In this case, it is necessary that connectors for signals from rotation angle sensors needed for the control of the rotary electric machine and signals for the measurement of the coil temperature of the stator be provided separately from the first and second connectors, and it is difficult to secure a space in which to mount the connectors of the power supply lines and the signal lines.

As a construction for overcoming this problem, Japanese Patent Application Publication No. 2008-301544 (JP-A-2008-301544) describes a rotary electric machine terminal block that is a composite connector combining a connector for supplying electric power and a connector for a sensor. FIG. 18 shows a rotary electric machine terminal block 150, and FIG. 19 shows an exploded view of the rotary electric machine terminal block 150 shown in FIG. 18, and FIG. 20 shows a sectional view of the rotary electric machine terminal block 150. In FIG. 18, the rotary electric machine terminal block 150 is provided on a transaxle case that contains an engine unit 250, an electricity generator unit 260 connected to a power splitting mechanism, and an electric motor unit 270 that generates drive force. As shown in FIG. 19, the rotary electric machine terminal block 150 connects a rotary electric machine of the electricity generator unit 260 and an electric power bus cable 141 via an electric power bus cable connector 143. Besides, a signal cable 116 for signals related to the rotation angle of the rotary electric machine and the like is connected to a signal line connector 113.

As shown in FIG. 19, in the rotary electric machine terminal block 150, a composite connector 110 having an electric power line connector 111 covered with a shield shell 112, the signal line connector 113 and a face seal member 118 is held to the electricity generator unit 260 by a plate 114 from above so that an opening of the electricity generator unit 260 is closed. As shown in FIG. 20, the opening of the electricity generator unit 260 is used to connect the electric power line connector 111 and the signal line connector 113 to the rotary electric machine. An edge of the opening is sealed with the face seal member 118 and the composite connector 110 is pressed to the electricity generator unit 260 by the plate 114 and plate-fastening screws 147 shown in FIG. 18 so that the opening of the electricity generator unit 260 is tightly closed.

Furthermore, as shown in FIG. 19, the electric power bus cable 141 extending along the electricity generator unit 260 is connected by the electric power bus cable connector 143 to the electric power line connector 111 of the rotary electric machine terminal block 150 (in the direction B in FIG. 19), and the terminal of the U, V and W-phase electric power bus cable 141 is fixed in a direction perpendicular to the electricity generator unit 260 (in the direction C in FIG. 19) by the plate-fastening screws 147. A water-proof seal cap 121 is fitted to the terminal. Besides, as shown in FIGS. 18 and 19, the electric power bus cable connector 143 is fixed to the electricity generator unit 260 by a cable stay 142 and cable stay screws 145, and the cable stay 142 and the shield shell 112 are fixed to each other by shield shell screws 146. Thus, in the related art, the composite connector 110 provided with the electric power line connector 111 and the signal line connector 113 is constructed.

However, the rotary electric machine terminal block 150 described in Japanese Patent Application Publication No. 2008-301544 (JP-A-2008-301544) is a die-cast component part made of a resin and aluminum, and is therefore inferior in strength to the case. Therefore, it sometimes happens that unpleasant sound or vibration from gears propagates to the rotary electric machine terminal block 150 via the case and therefore the plate 114 surrounding the composite connector 110 resonates. In order to prevent this resonance, it is conceivable to attach a reinforcement member for enhancing the strength of the plate. However, in such a case, the size of the composite connector 110 becomes large so that the composite connector 110 may interfere with another appliance and may not be able to be mounted. Besides, if the plate 114 and the composite connector 110 are provided as separate members, the mounting operation becomes complicated. Therefore, it is necessary to integrate the plate 114 and the composite connector 110 through the use of screws or the like, which makes it difficult to reduce the number of component parts.

SUMMARY OF INVENTION

The invention provides a rotary electric machine terminal block that prevents the resonance of a plate provided in the terminal block without increasing the number of component parts.

A first aspect of the invention relates to a rotary electric machine terminal block that fits into an opening of a case in which a rotary electric machine is provided, and that is fixed to the case by a presser plate. The rotary electric machine terminal block has: an electric power line connector that relays electric power to the rotary electric machine; a signal line connector that relays a sensor signal for detecting a rotation angle of the rotary electric machine; a mount that is formed by disposing the electric power line connector and the signal line connector on the presser plate and performing insert molding so that an anti-vibration plate is formed by a resin on an upper surface of the presser plate; and a projected portion of the presser plate that is projected radially outward from the mount and that has a fixation hole for fixing the presser plate to the case, and the presser plate is made of a metal. Due to this construction, the resonance of the presser plate (metal-made plate) of the rotary electric machine terminal block is reduced by the anti-vibration plate, so that the vibration and sound propagated from the terminal block can be reduced.

Besides, a second aspect of the invention relates to a rotary electric machine terminal block that fits into an opening of case in which a rotary electric machine is provided, and that is fixed to the case by a presser plate. This rotary electric machine terminal block has: an electric power line connector that relays electric power to the rotary electric machine; a signal line connector that relays a sensor signal for detecting a rotation angle of the rotary electric machine; a mount that is formed by disposing the electric power line connector and the signal line connector on the presser plate and performing insert molding so that a lower surface of the presser plate is covered with a resin; a projected portion of the presser plate that is projected radially outward from the mount and that has a fixation hole for fixing the presser plate to the case; and a first seal member that causes the mount to be tightly attached to the case, and the presser plate is made of a metal, and the presser plate is provided with a corrugated-shape protrusion for changing a resonance frequency of the terminal block. Because of this construction, it is possible to reduce the void that is formed within the resin when the amount of resin used is reduced, and also restrain the formation of a gap between the resin and the presser plate.

The rotary electric machine terminal blocks in accordance with the invention each achieve the effect of enabling the prevention of the resonance of the plate provided in the terminal block without increasing the number of component parts. Besides, the production of the rotary electric machine terminal block, the use of the insert molding process makes it possible to mold the anti-vibration portion integrally with the upper surface of the plate, so that the production cost can be reduced.

BRIEF DESCRIPTION OF DRAWINGS

The features, advantages, and technical and industrial significance of this invention will be described below with reference to the accompanying drawings, in which like numerals denote like elements, and wherein:

FIG. 9 is an illustrative diagram illustrating a rotary electric machine terminal block in accordance with a third embodiment of the invention;

DETAILED DESCRIPTION OF EMBODIMENTS

Hereinafter, first to fifth embodiments of the invention will be described with reference to the drawings.

Figure 1:
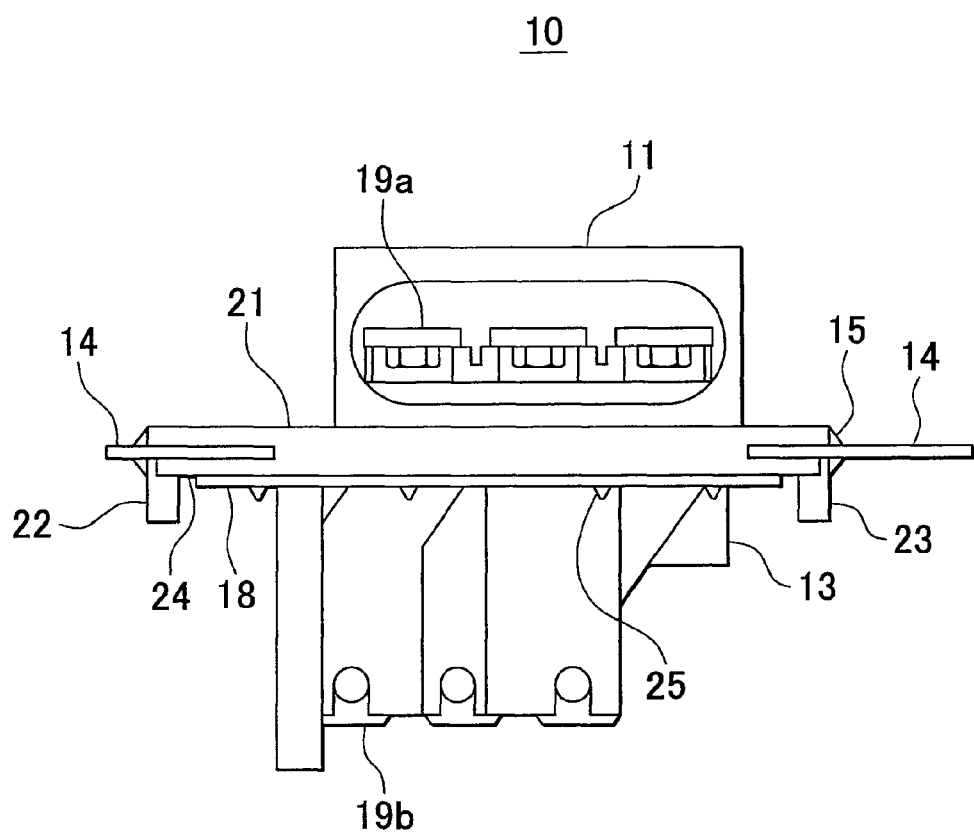
FIG. 1 is a front view of a rotary electric machine terminal block in accordance with a first embodiment of the invention.

FIG. 1 shows a rotary electric machine terminal block 10 in accordance with the first embodiment. Incidentally, the rotary electric machine terminal block 10 is connected to an electricity generator unit; specifically, the rotary electric machine terminal block 10 is fitted into an opening of a case that contains a rotary electric machine, and is fixed to the case by a plate 14. The rotary electric machine terminal block 10 has: a mount that is formed by fixing an electric power line connector 11 and a signal line connector 13 to the steel-made plate 14 and then performing insert molding so that an anti-vibration portion 21 is formed on an upper surface of the plate 14; a projected portion of the plate 14 which has fixation holes for fixing the rotary electric machine terminal block 10 to the case; an edge seal member 15 covering an edge of the projected portion; and a face seal member 18 that achieves tight attachment between the case and the mount.

One of the features of a rotary electric machine terminal block in accordance with the invention lies in the prevention of resonance of the plate that covers the composite connector. That is, the vibration and sound is reduced by damping the resonance of the plate besides improving only the strength of the plate alone. Therefore, in the rotary electric machine terminal block of this embodiment, a steel plate having high rigidity is used instead of an aluminum plate in order to reduce the plate thickness, and an anti-vibration plate (anti-vibration portion 21) is stuck to a surface of the steel plate.

Figure 2:
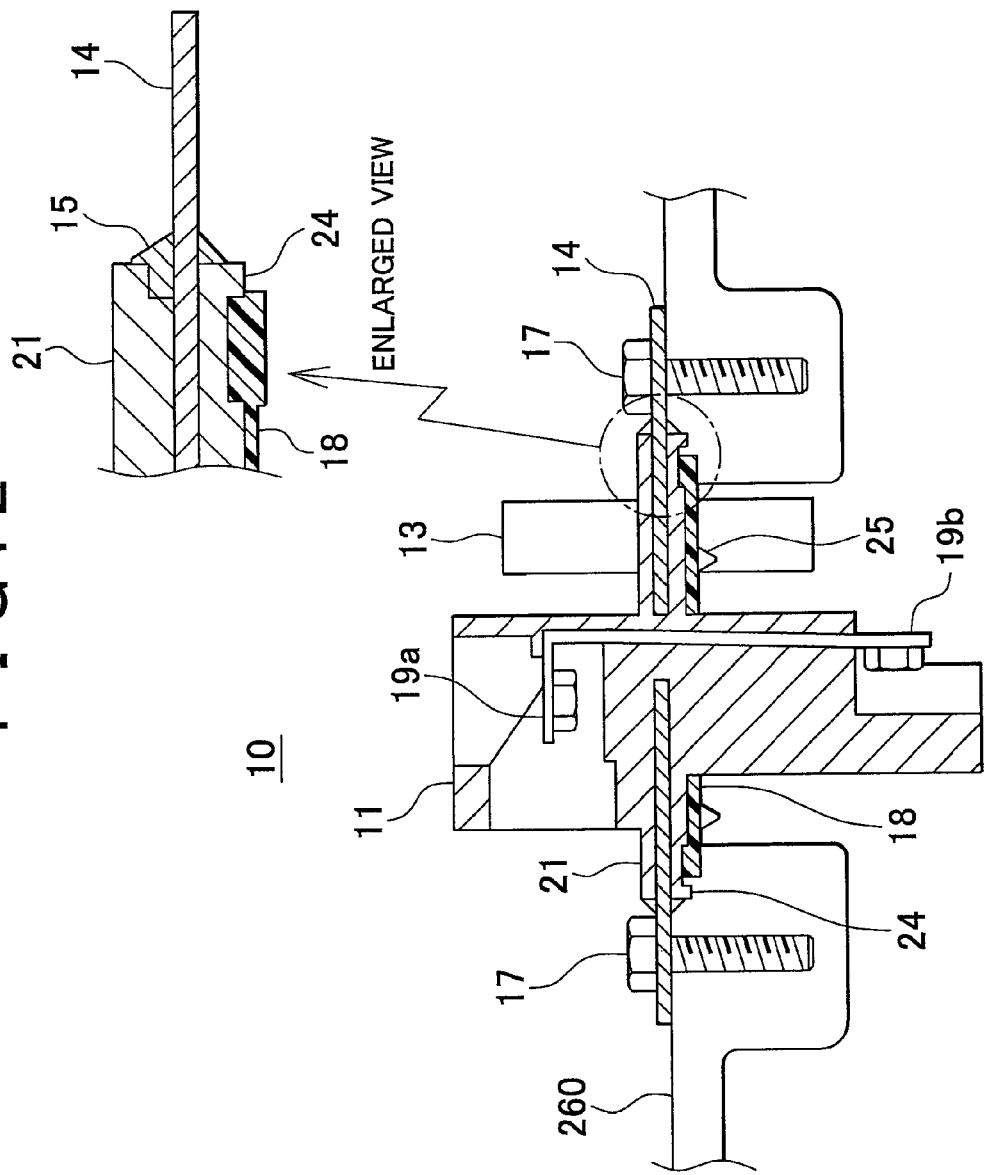
FIG. 2 is a sectional view of the rotary electric machine terminal block in accordance with the first embodiment.

FIG. 2 is a side sectional view of the rotary electric machine terminal block 10. In the drawing, a resin-made anti-vibration portion 21 is provided on an upper surface of the plate 14. The anti-vibration portion 21 can be mounted by using screws or the like; however, this will increase the number of component parts. Therefore, in this embodiment, the electric power line connector 11, the signal line connector 13 and the plate 14 are placed in a molding die, and an insert molding process is performed with a molten resin. Thus, reduction in size and reduction in the number of component parts are achieved. However, the provision of the anti-vibration portion 21 sometimes causes a problem. That is, when the rotary electric machine terminal block is attached to the case, the plate 14 may deform so as to be pulled to the case side, which may result in formation of a gap between the anti-vibration portion 21 and the plate 14. Therefore, as shown in the enlarged view in FIG. 2, formation of such a gap is prevented by disposing the edge seal member 15 on an edge portion of the projected portion of the plate 14 which is attached to the case, that is, a water-proof configuration that prevents entrance of rainwater into a gap is provided. Incidentally, a support portion 24 provided on the lower side of the plate 14, although a gap will not form therebetween due to compression by the plate 14, is disposed in order to hold the edge seal member 15. Next, the connection of cables and the water-proof configuration of the projected portion will be described.

Figure 3:
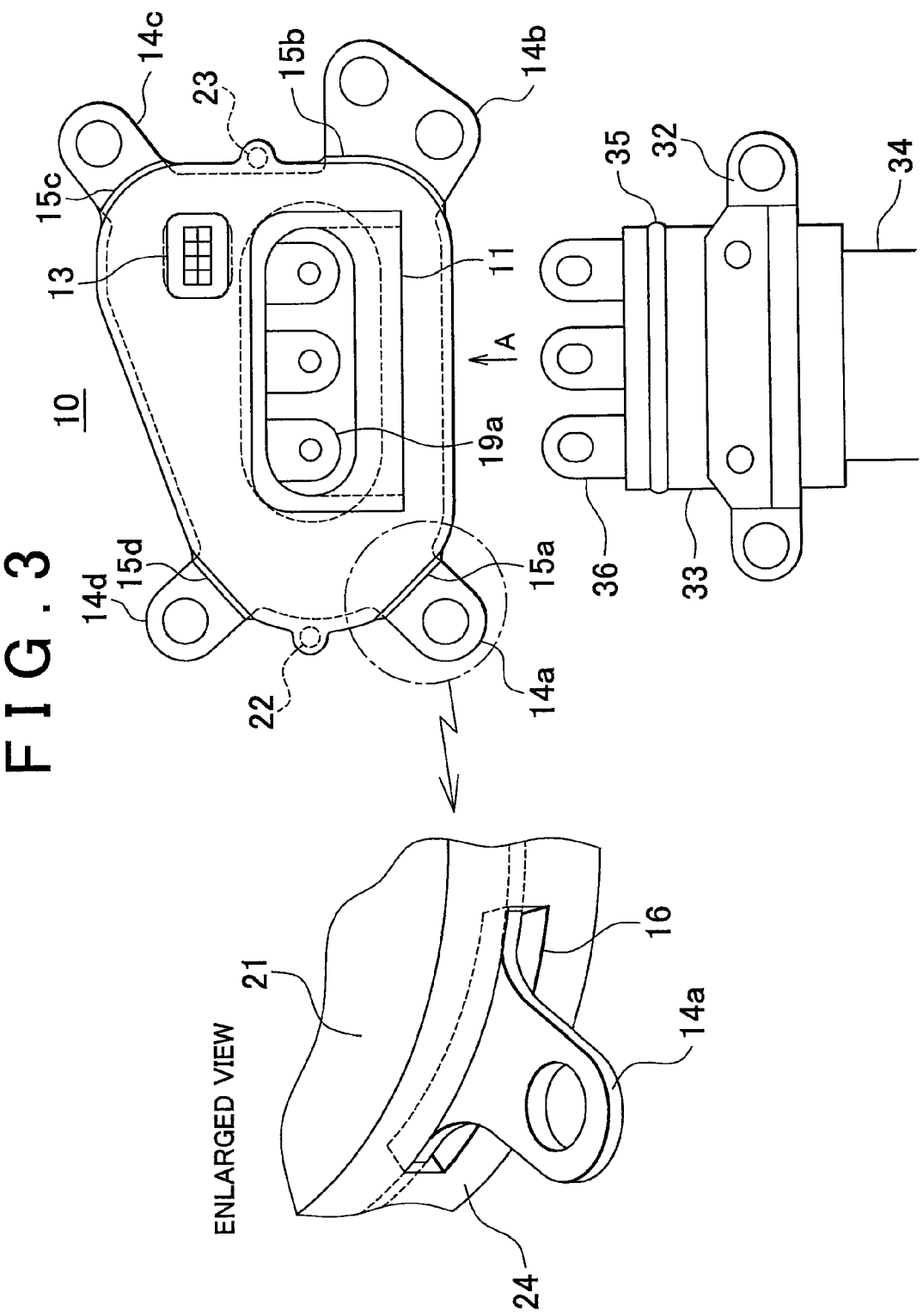
FIG. 3 is an illustrative diagram showing a method of inserting an electric power bus cable to the rotary electric machine terminal block in accordance with the first embodiment and a water-proof configuration of projected portions.

FIG. 3 shows a method of inserting an electric power bus cable 34 to the rotary electric machine terminal block 10 and the water-proof configuration of the projected portions of the plate 14. The electric power bus cable 34 includes: an electric power bus cable connector 33 whose electric power bus terminals 36 are connected to U, V and W-phase electric power bus cables; a water-proof seal 35 provided on the electric power bus cable connector 33; and a cable stay 32 for fixing the electric power bus cable 34. The electric power bus cable connector 33 is inserted through an insert hole that is formed in a side surface of the electric power line connector 11, and then the electric power bus terminals 36 are fixed to electric power terminal plates 19 by screws. In this manner, electrical conduction between the rotary electric machine and the electric power bus cable 34 is secured. Besides, the electric power bus cable 34 is fixed to the case via the cable stay 32 of the electric power bus cable connector 33.

An enlarged view in FIG. 3 shows a water-proof configuration of a projected portion 14a. A pocket portion 16 for disposing an edge seal member 15a is provided near a basal portion of the projected portion 14a of the rotary electric machine terminal block 10. The pocket portion 16 provides a space into which the edge seal member 15a is fitted in order to make water-proof boundaries between the projected portion 14a and the anti-vibration portion 21 and the support portion 24. Incidentally, although this embodiment employs the edge seal member, substantially the same effect can also be achieved by applying an elastic adhesive.

Figure 4:
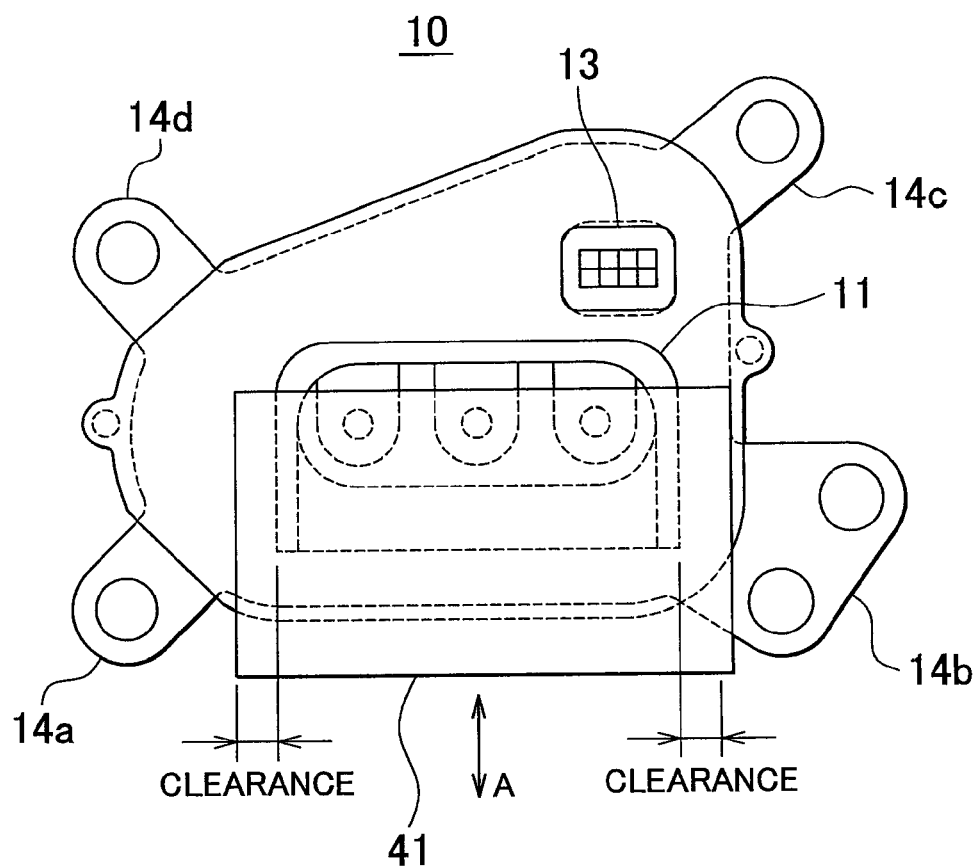
FIG. 4 is an illustrative diagram showing requirements for an insert-molding die for the rotary electric machine terminal block in accordance with the first embodiment.

Next, a production method for the rotary electric machine terminal block will be briefly described. FIG. 4 shows an example of requirements for an insert-molding die that is used for the rotary electric machine terminal block 10. The molding die of the rotary electric machine terminal block is formed by combining a plurality of dies. In the production method for the rotary electric machine terminal block, after the electrodes and plates of the connector, and the like, are disposed in divided molding dies, it is necessary to inject a molten resin into the die assembly and then separate the dies and extract the molded rotary electric machine terminal block. In particular, in this embodiment, since a space into which an electric power bus capable is inserted, there is a requirement for the molding die that interference between slide regions of the divided dies and the projected portions of the plate be avoided.

In this embodiment, in order to secure a space into which the electric power bus cable connector is inserted while meeting the foregoing requirement for the molding die, a necessary clearance (of about 10 mm) is secured by taking into account the arrangement of the projected portions 14a and 14b of the plate 14. The securement of such a clearance makes it possible to form an outer peripheral portion of the electric power line connector and an insert portion of the electric power bus cable connector.

Figure 5:
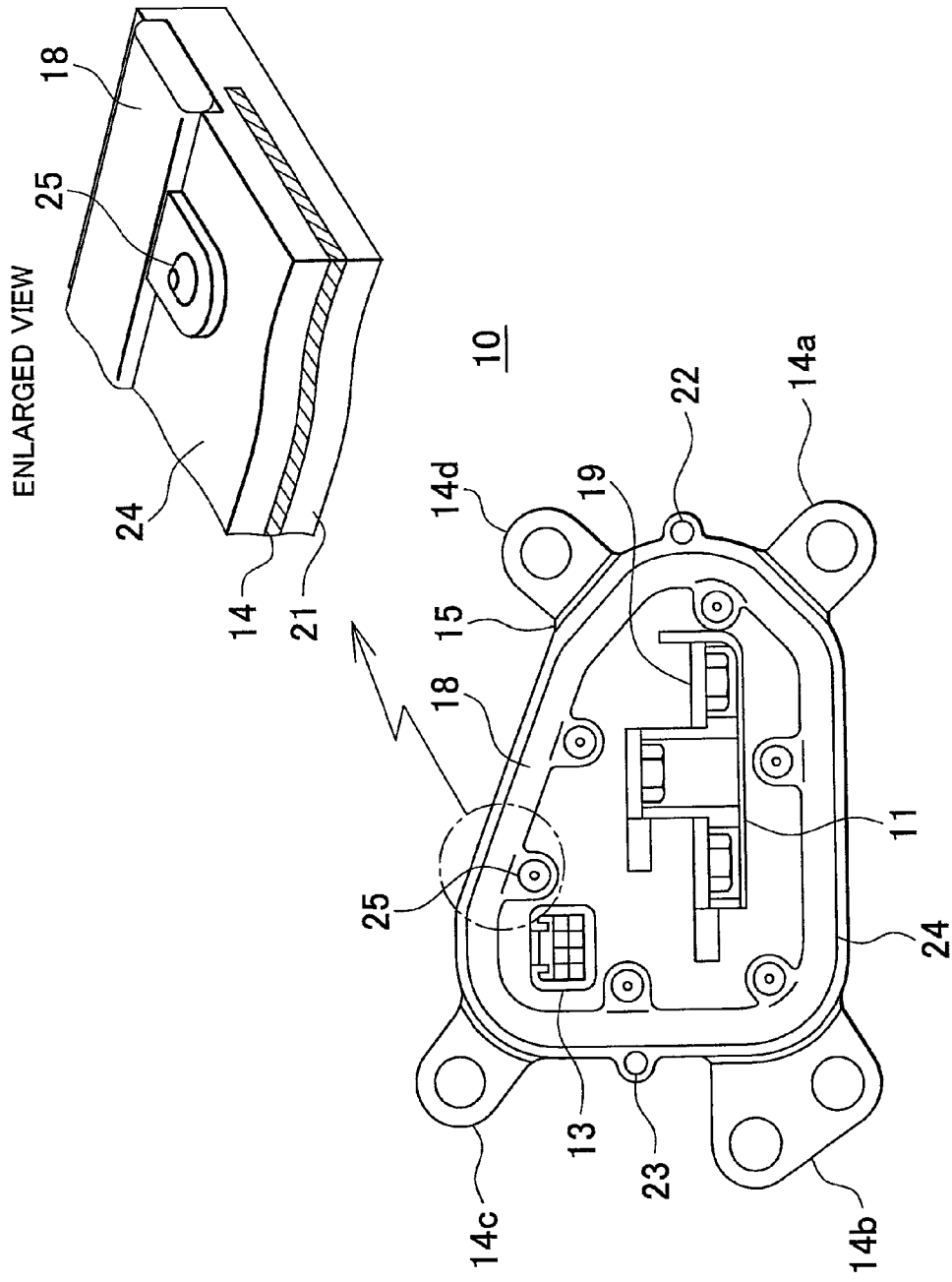
FIG. 5 is a bottom view of the rotary electric machine terminal block in accordance with the first embodiment.

Next, arrangement of the face seal member 18 in relation to the configuration of the plate 14 will be briefly described with reference to FIG. 5. FIG. 5 shows a bottom view of the rotary electric machine terminal block 10, and an enlarged perspective view of a face seal stopper 25 and its surroundings. In FIG. 5, the support portion 24 is provided with positioning pins 22 and 23 that fit into pin holes that are formed in the case to fix the position of the rotary electric machine terminal block 10. Besides, as shown in the enlarged view, the face seal member 18 is fixed to the terminal block by fitting to the conical face seal stopper 25 that is provided on the support portion 24 of the terminal block. Since an outer peripheral portion of the plate 14 is disposed so as to cover the face seal member 18, the opening of the case is tightly closed as the face seal member 18 is pressed by uniform load.

Figure 6:
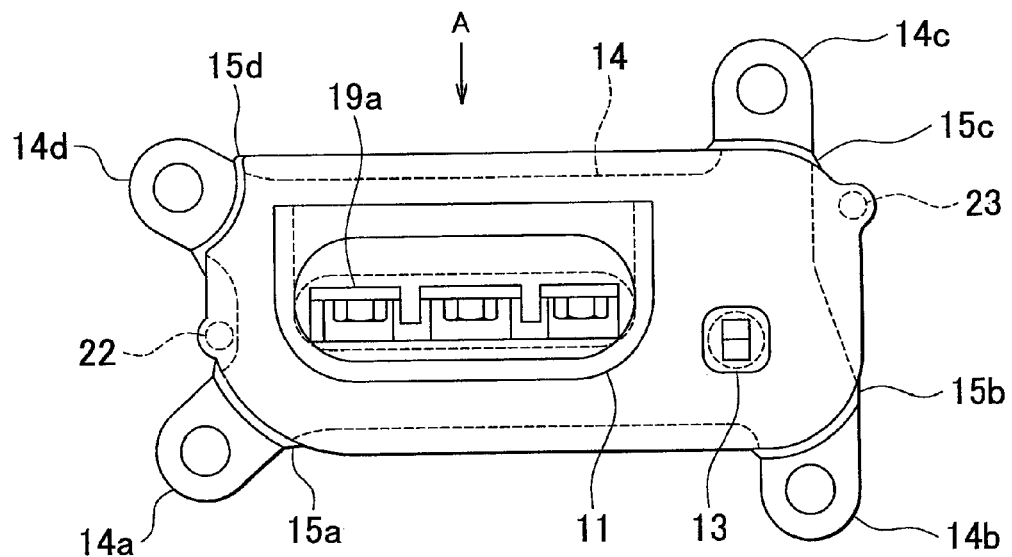
FIG. 6 is a front view of a rotary electric machine terminal block in accordance with a second embodiment of the invention.
Figure 7:
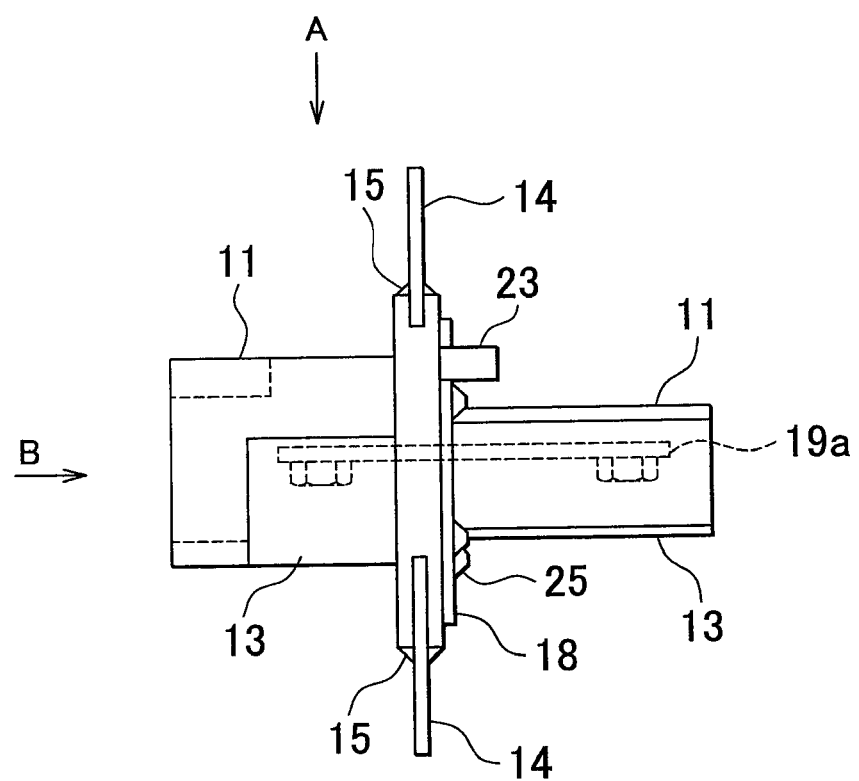
FIG. 7 is a side view of the rotary electric machine terminal block in accordance with the second embodiment.
Figure 8:
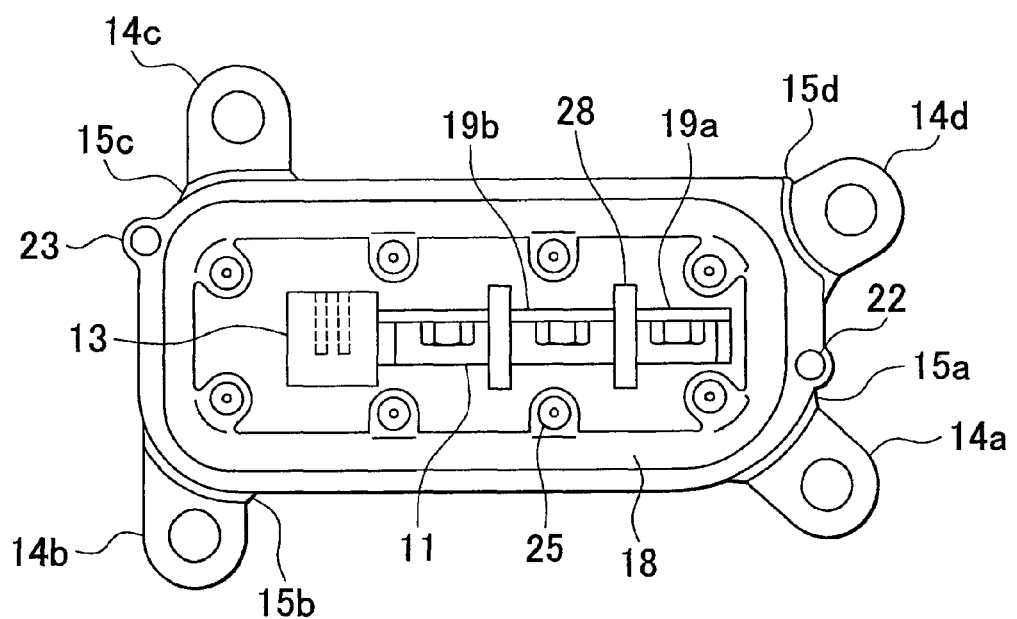
FIG. 8 is a bottom view of the rotary electric machine terminal block in accordance with the second embodiment.

FIG. 6 shows a front view of a rotary electric machine terminal block 20 in accordance with a second embodiment, and FIG. 7 shows a side view thereof, and FIG. 8 shows a bottom view thereof. The rotary electric machine terminal block 20 shown in FIG. 6 is connected to a rotary electric machine of an electric motor unit, and has an electric power line connector 11, a signal line connector 13, a plate 14, an edge seal member 15, and positioning pins 22 and 23. As shown in FIG. 7, an electric power bus cable is inserted into the rotary electric machine terminal block 20 in a direction B and another electric power bus cable is inserted thereinto in a direction A, and the two electric power bus cables are screwed to the electric power terminal plates, so that electric conduction between the two bus cables is secured.

Besides, one of the features of the embodiment is that partition plates 28 for setting a predetermined creepage distance are each provided between an electric power terminal plate 19*a* and an adjacent electric power terminal plate 19*b* as shown in FIG. 8, and the electric power terminal plates are arranged on a straight line. This arrangement makes it possible for the plate 14 to cover the electric power terminal plates and the sensor signal lines or their vicinities as shown in FIG. 6. In this manner, improved strength of the rotary electric machine terminal block 20 and reduced radiation of electromagnetic noise are achieved as well as a reduced size of the terminal block.

Figure 19:
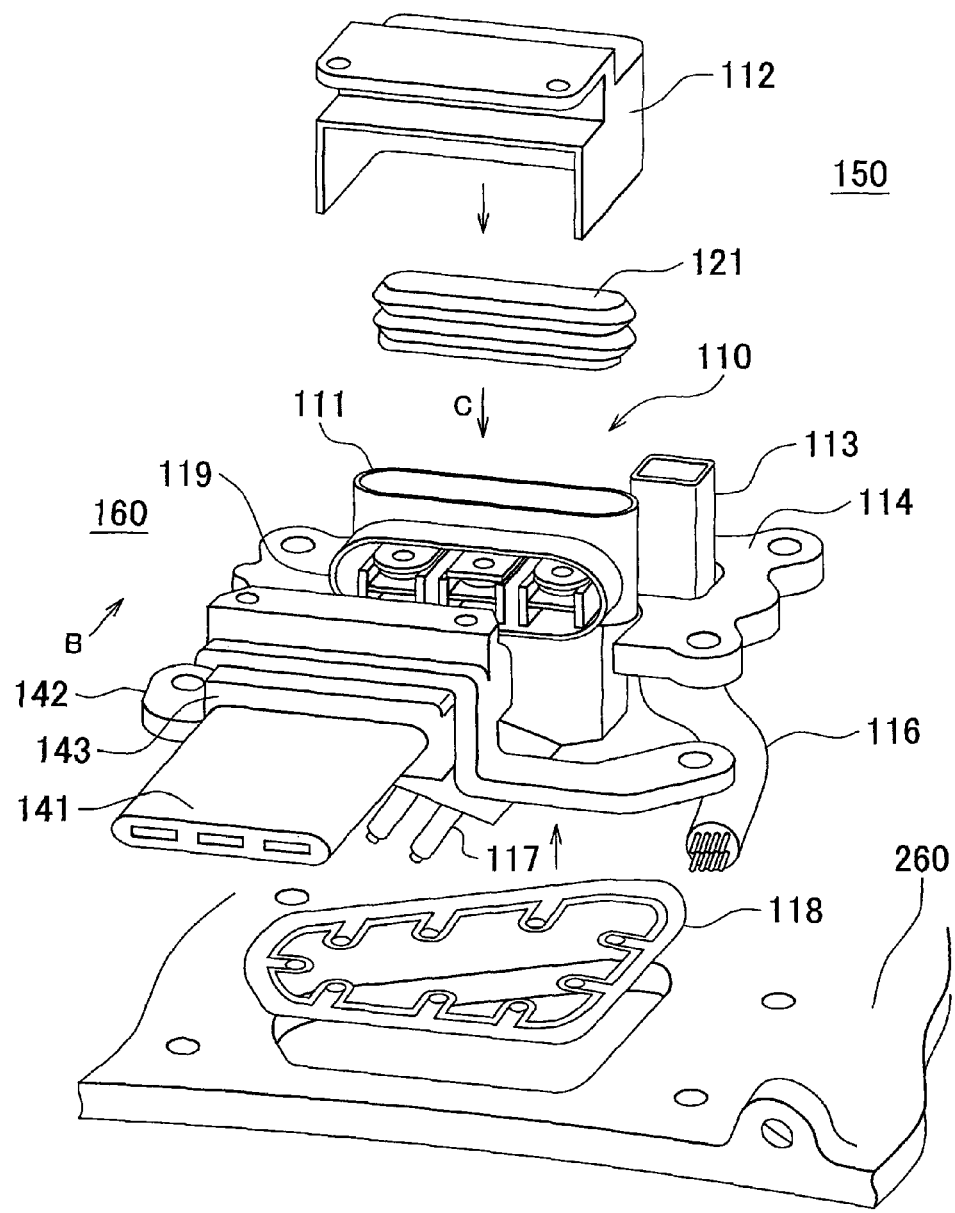
FIG. 19 is an exploded view of the rotary electric machine terminal block shown in FIG. 18.
Figure 20:
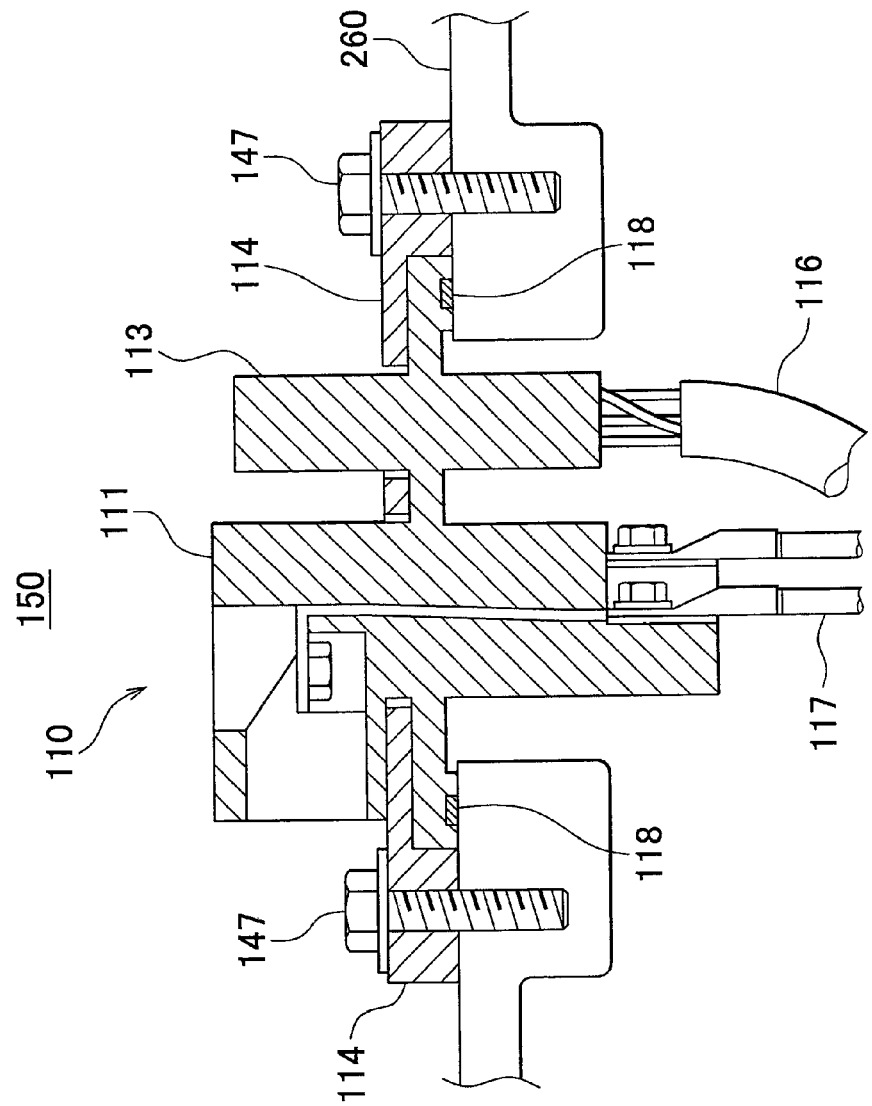
FIG. 20 is a sectional view of a central portion of the rotary electric machine terminal block shown in FIG. 18.

FIG. 9 shows a rotary electric machine terminal block 30 in accordance with a third embodiment of the invention. An anti-vibration portion 21 of the rotary electric machine terminal block 30 exposes an outer peripheral portion of the plate 14 and projected portions 14*a* to 14*d* projected from the outer peripheral portion of the plate 14. As shown in the enlarge view of the projected portion 14*a* in FIG. 19, the distance between the screwing position of projected portion 14*a* and the edge of the anti-vibration portion 21 is increased in this embodiment so as to reduce the amount of deformation of the plate 14 that occurs at the edge of the anti-vibration portion 21 and therefore prevent formation of a gap at the edge of the anti-vibration portion 21. Thus, this embodiment eliminates the need for an edge seal member, and further reduces the number of component parts. Incidentally, in this embodiment, an outer peripheral portion of the plate 14 is provided with through holes 26 of several millimeters in diameter for connecting the anti-vibration portion 21 and the support portion 24, so that the anti-vibration portion 21 will not peel off from the plate 14. Although this embodiment adopts the arrangement of the through holes, this is not restrictive. For example, surfaces of the plate 14 may be roughened so as to prevent the anti-vibration portion 21 from peeling off from the plate 14.

Figure 10:
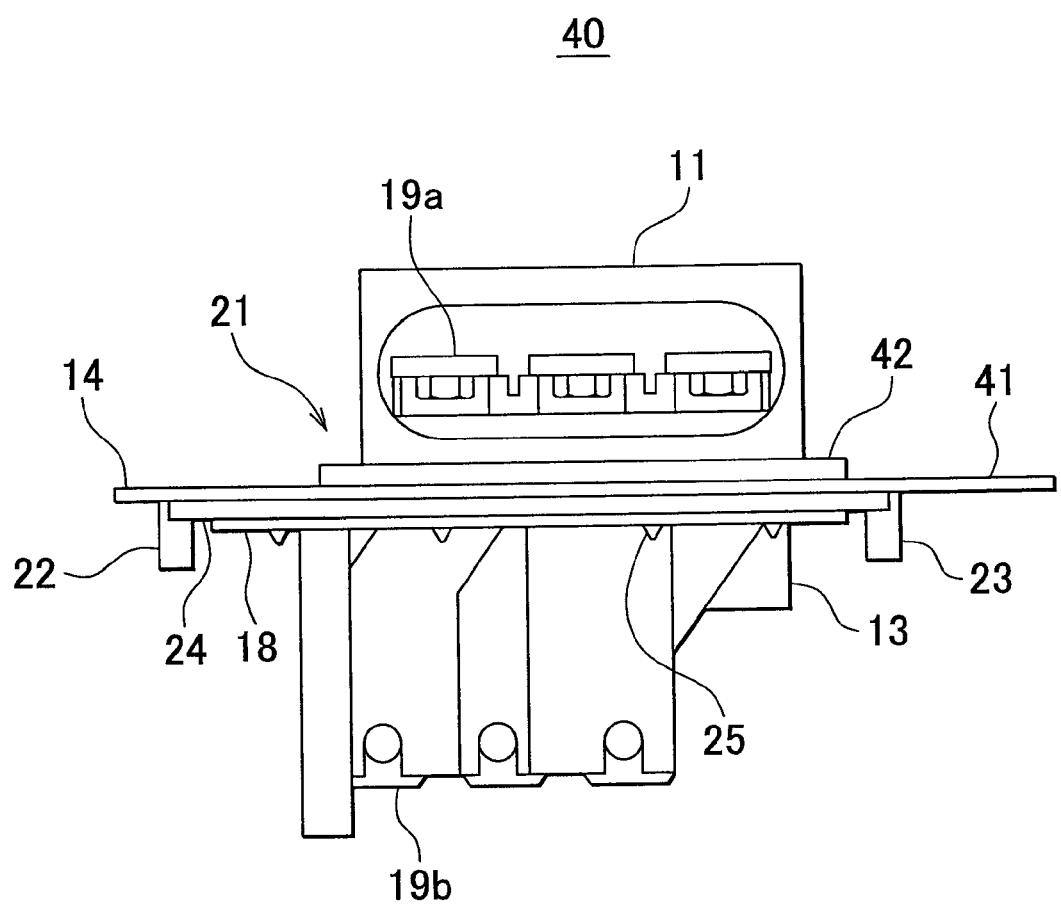
FIG. 10 is a front view of a rotary electric machine terminal block in accordance with a fourth embodiment of the invention.
Figure 11:
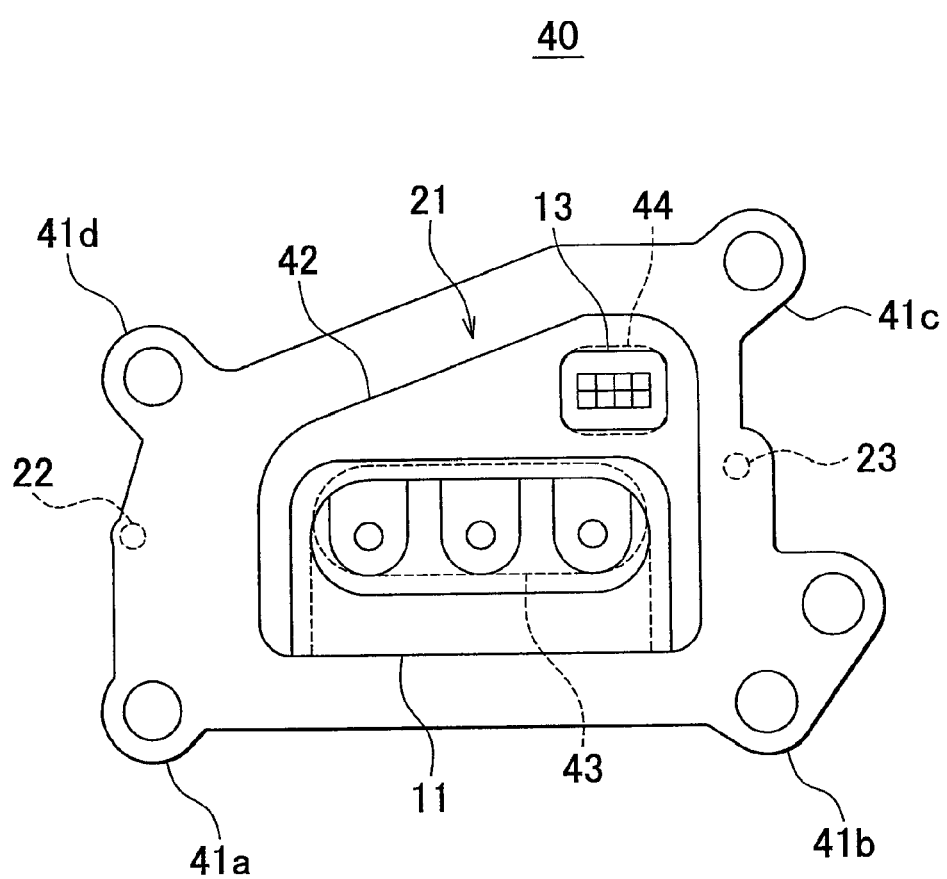
FIG. 11 is a bottom view of a rotary electric machine-terminal block in accordance with the fourth embodiment.

FIG. 10 and FIG. 11 show a rotary electric machine terminal block 40 in accordance with a fourth embodiment. The rotary electric machine terminal block 40 is connected to an electricity generator unit; specifically, the rotary electric machine terminal block 40 fits into an opening of a case that contains a rotary electric machine, and is fixed to the case via a plate 41. In this embodiment, the plate 14 of the rotary electric machine terminal block 30 shown in FIG. 9 is reviewed in terms of quality and plate thickness, and the anti-vibration portion 21 shown in FIG. 9 is replaced with a plate presser 42 that is smaller in size than the anti-vibration portion 21. In this manner, formation of a gap at the edge portion of the plate presser 42 or of a void at the time of the resin molding process is prevented. In this embodiment, the steel-made plate 14 has a plate thickness that is increased by several percent.

One of the features of the embodiment is that in conjunction with the reduction of the anti-vibration portion 21, decline of the strength of the plate 41 is reduced by narrowing the openings 43 and 44 for the electric power line connector 11 and the signal line connector 13 which are formed in the plate 41, and at the same time, in order to curb the void or the crack that occurs in the resin that flows around and into the openings 43 and 44 during the resin molding process, the amount of resin that flows in is reduced from an ordinary level. As a result, it becomes possible to reduce the size of the anti-vibration portion 21 and therefore curb the formation of a gap between the plate 41 and the plate presser 42 and of a void within the resin.

Figure 12:
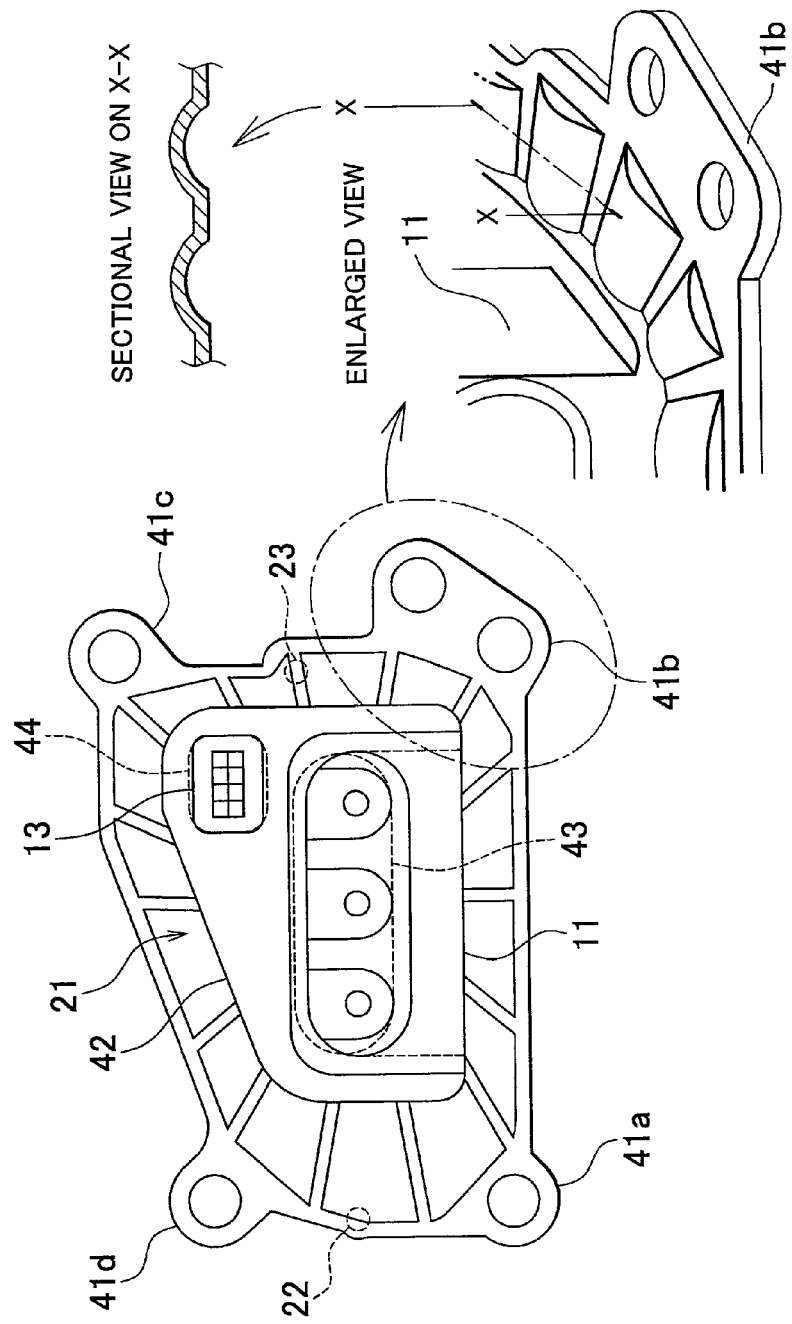
FIG. 12 shows a first modification of the rotary electric machine terminal block in accordance with the fourth embodiment.

FIG. 12 shows a first modification of the rotary electric machine terminal block 40 in accordance with the fourth embodiment. The plate 41 of the rotary electric machine terminal block 40 shown in FIG. 12 is provided with reinforcement protrusions that extend radially from the electric power line connector 11. As shown in an enlarged view and a cross-sectional view taken on line X-X of the enlarged view in FIG. 12, the reinforcement protrusions are formed by a pressing process so as to have an arcuate swell shape so as to have an arcuate profile (collectively form a corrugated plate configuration). Besides, in the pressing process, portions surrounding the fixture holes of the plate 41 are formed so as to have a flat surface, for the purpose of securing tight attachment to the case, while the radial reinforcement protrusions are formed so as to extend radially from the electric power line connector 11. The vicinity of a basal portion of the electric power line connector 11 is provided with a configuration in which the reinforcement protrusions and flat surface portions alternate with each other. Therefore, in the resin molding process, the resin that is to form the electric power line connector 11 flows and fills along the reinforcement protrusions of the plate 41, so that the anti-vibration portion 21 and the plate 41 are even more firmly adhered together.

Figure 13:
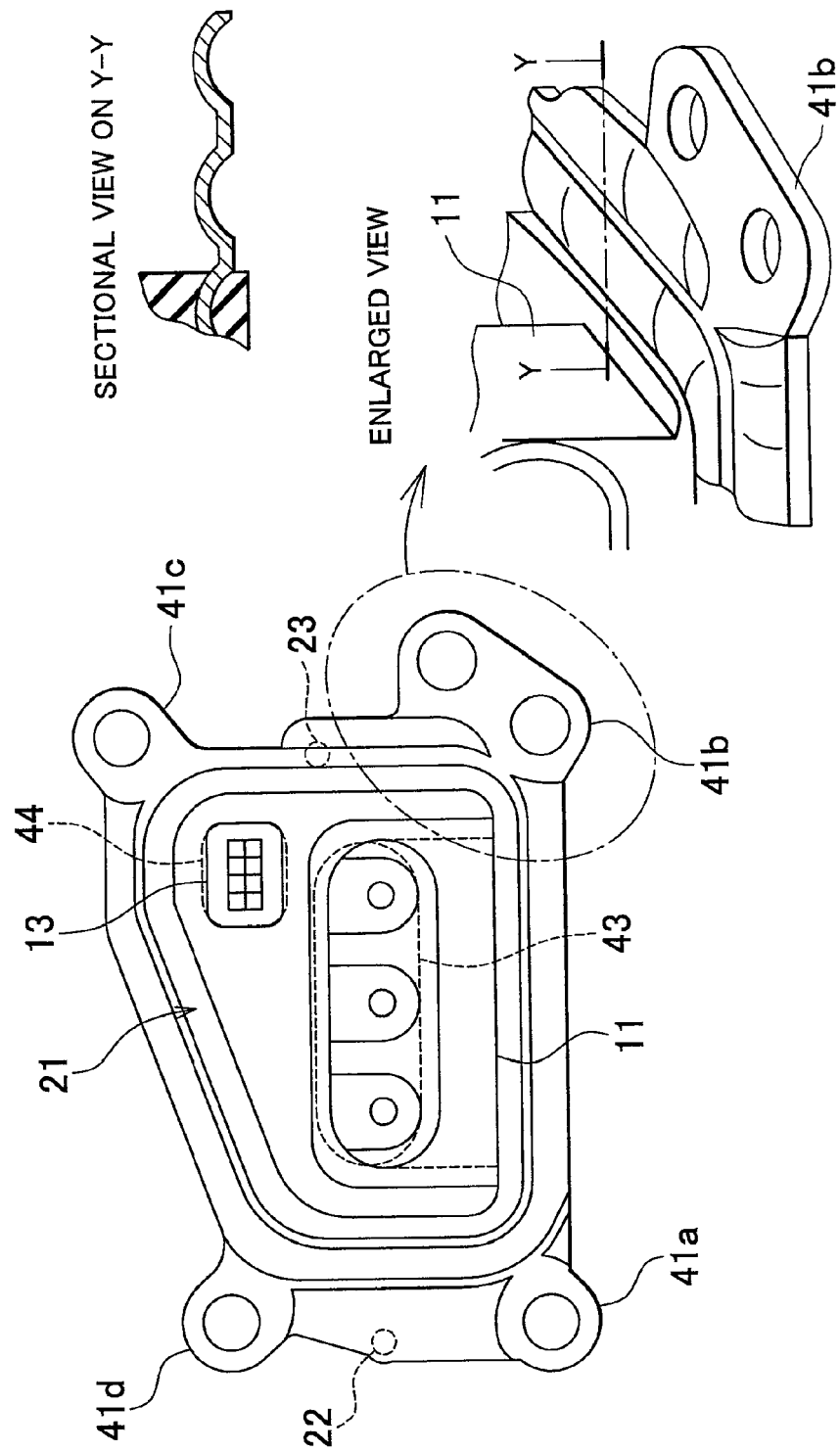
FIG. 13 shows a second modification of the rotary electric machine terminal block in accordance with the fourth embodiment.

FIG. 13 shows a second modification of the rotary electric machine terminal block in accordance with the fourth embodiment of the invention. The rotary electric machine terminal block 40 shown in FIG. 13 is provided with reinforcement protrusions that extend radially from the electric power line connector 11. As shown in an enlarged view and a cross-sectional view taken on line Y-Y of the enlarged view in FIG. 13, the reinforcement protrusions are formed by a pressing process so as to have an arcuate swell shape (collectively form a corrugated plate configuration) that is similar in shape to but different in direction from the shape of the reinforcement protrusions in the first modification shown in FIG. 12. The reinforcement protrusions not only enhance the strength of the plate 41, but also achieve an enhanced effect of "wedges" as the reinforcement protrusions juxtaposed in a circumferential direction work together with the resin, which forms the electric power line connector 11, flows and fills along the profiles of the reinforcement protrusions of the plate 41 and hardens thereon. As a result, the anti-vibration portion 21 and the plate 41 become firmly adhered to each other.

Figure 14:
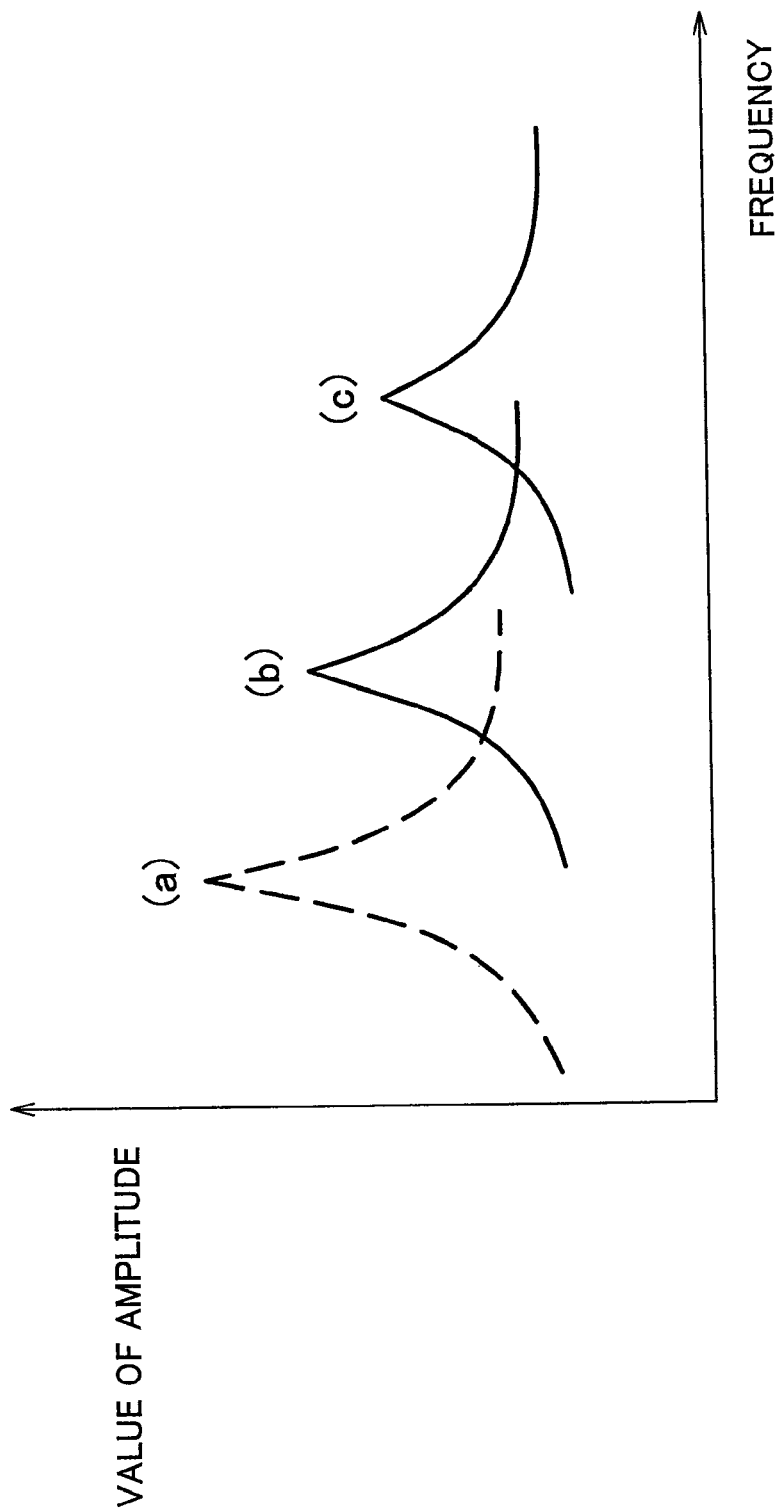
FIG. 14 is an illustrative diagram illustrating vibration characteristics of rotary electric machine terminal blocks.

FIG. 14 is a graph showing vibration characteristics of rotary electric machine terminal blocks in accordance with the foregoing embodiments, in which the horizontal axis shows the frequency and the vertical axis shows the value of amplitude of vibration. In the graph, a dashed line (a) shows an average vibration characteristic of a rotary electric machine terminal block as shown above as the first to third embodiments, and a solid line (b) shows an average vibration characteristic of a rotary electric machine terminal block in which the strength of the plate is enhanced by material or by plate thickness, and a solid line (c) shows an average vibration characteristic of a rotary electric machine terminal block in which the plate is provided with reinforcement protrusions. Generally, the vibration characteristic has a tendency that the frequency characteristic becomes lower the greater the mass, and becomes higher the smaller the mass. In this embodiment, by reducing the amount of resin used for the anti-vibration portion 21 and improving the mechanical strength of the plate, the vibration characteristic is shifted to the higher frequency side and the amplitude value is reduced while the mass is reduced. Besides, by shifting the vibration characteristic to the higher frequency, it is possible to improve anti-vibration effect while using a small amount of resin.

Figure 15:
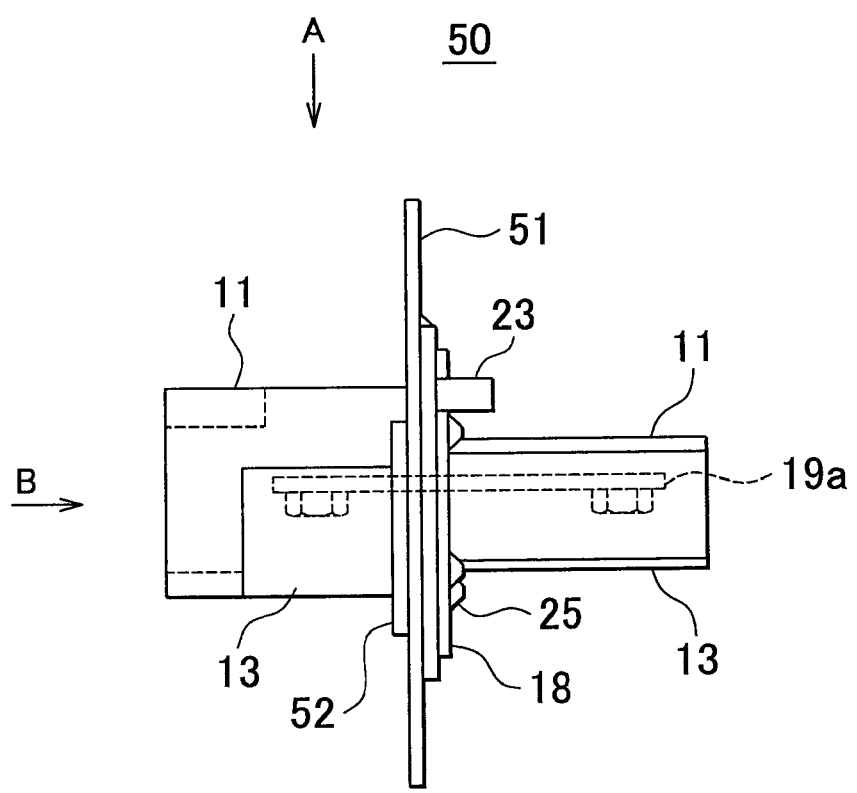
FIG. 15 is a front view of a rotary electric machine terminal block in accordance with a fifth embodiment of the invention.
Figure 16:
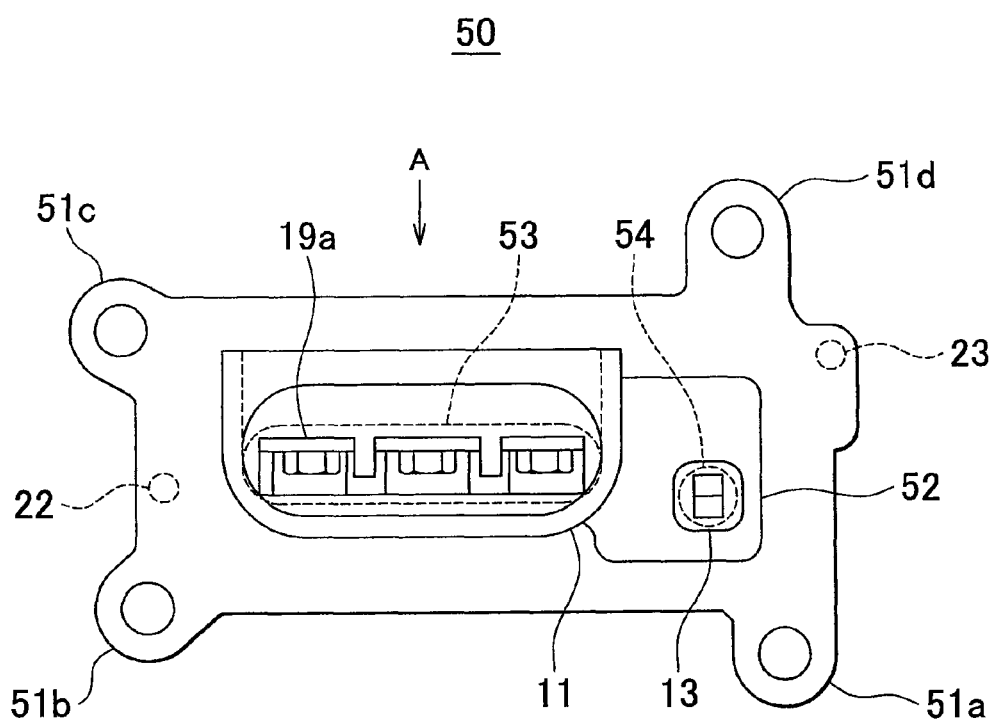
FIG. 16 is a bottom view of a rotary electric machine terminal block in accordance with the fifth embodiment.

FIG. 15 shows a front view of a rotary electric machine terminal block 50 in accordance with a fifth embodiment, and FIG. 16, shows a bottom view thereof. The rotary electric machine terminal block 50 in FIG. 15 is connected to a rotary electric machine of an electric motor unit, and has an electric power line connector 11, a signal line connector 13, a plate 51, a plate presser 52, and positioning pins 22 and 23. Besides, an electric power bus cable is inserted into the rotary electric machine terminal block 50 in a direction B and another electric power bus cable is inserted thereinto in a direction A, and the two electric power bus cables are screwed to electric power terminal plates, so that electric conduction between the two bus cables is secured.

It is to be noted herein that since the rotary electric machine terminal block 50 shown in FIGS. 15 and 16 is smaller in most dimensions than the foregoing rotary electric machine terminal block 40, the size of the plate presser 52 can also be reduced. In this embodiment, the plate 14 of the rotary electric machine terminal block 20 shown in FIG. 6 is reviewed in terms of quality and plate thickness, and the anti-vibration portion 21 shown in FIG. 6 is replaced with a reduced-size anti-vibration portion. In this manner, formation of a gap, a void, a crack, etc. is prevented.

Figure 17:
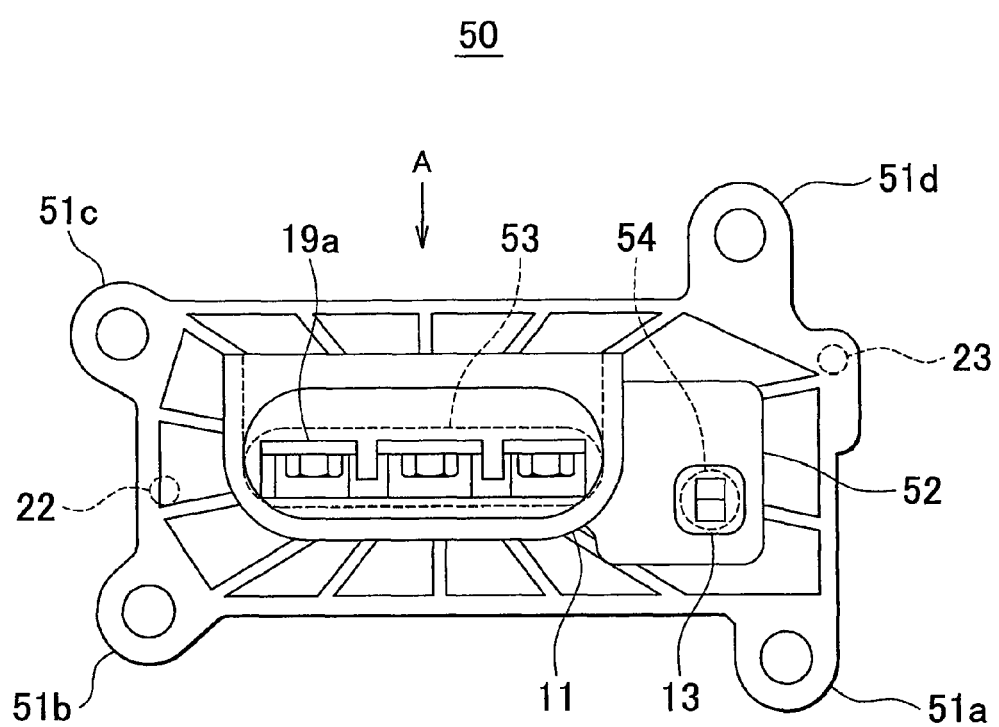
FIG. 17 shows a modification of the rotary electric machine terminal block in accordance with the fifth embodiment.
Figure 18:
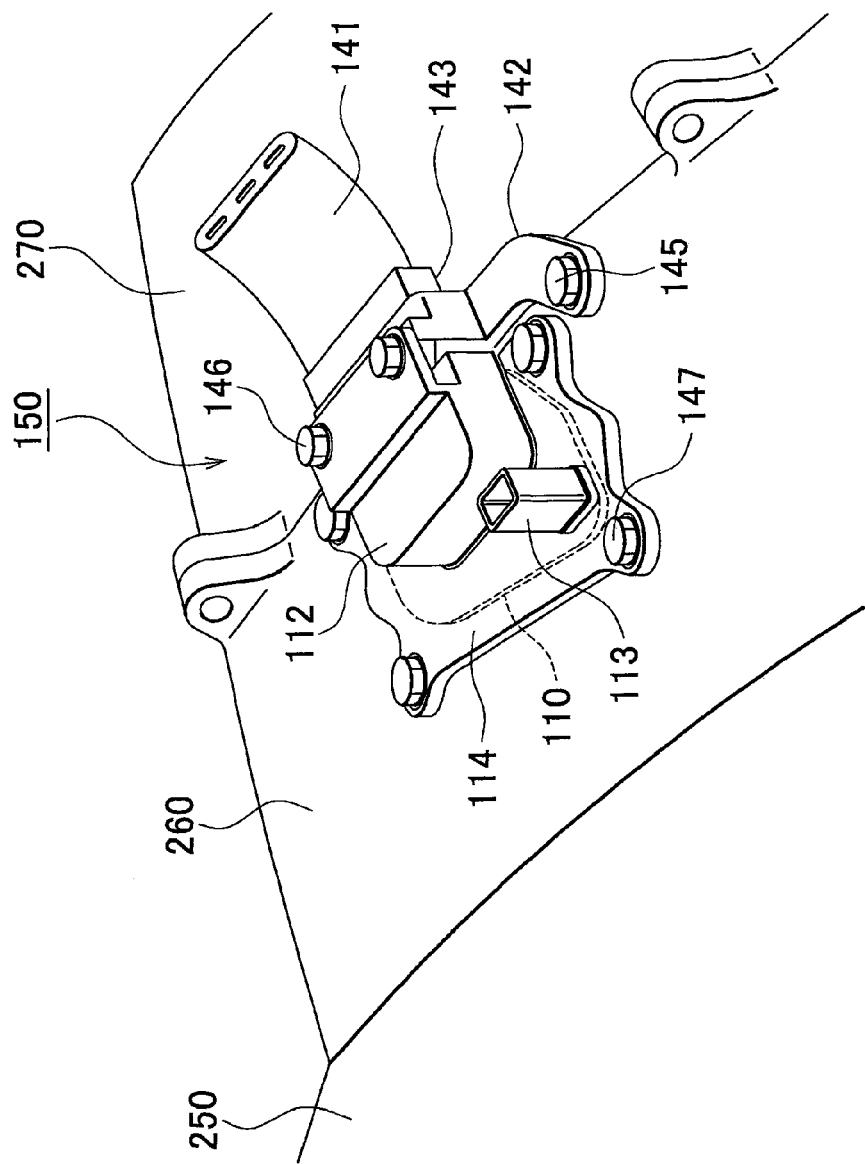
FIG. 18 is a perspective view of a rotary electric machine terminal block in a related art.

FIG. 17 shows a modification of the fifth embodiment. In a rotary electric machine terminal block 50 shown in FIG. 17, a plate 51 is provided with reinforcement protrusions that extend radially from an electric power line connector 11, and the vicinity of a basal portion of the electric power line connector 11 is provided with a configuration in which the reinforcement protrusions and flat surface portions alternate with each other, as in the foregoing modification. In particular, during the resin molding process, the resin that is to form the electric power line connector 11 flows and fills along the reinforcement protrusions of the plate 51, so that the protrusions cause the anti-vibration portion 21 and the plate 51 to be firmly adhered to each other. Incidentally, in conjunction with the foregoing embodiments, the radial reinforcement protrusions and the circumferential reinforcement protrusions are described for the sake of convenience in description. However, the shape of the reinforcement portions is not limited to a protruded shape, but may also be a recess shape. It is also permissible to combine radial protrusions and circumferential protrusions.

As can be understood from the foregoing description, the rotary electric machine terminal blocks of the foregoing embodiments make it possible to prevent the resonance of the plate provided in a terminal block without increasing the number of component parts. Besides, in the production of the rotary electric machine terminal block, the use of the insert molding process makes it possible to form an anti-vibration portion integrally on an upper surface of the plate, so that the size of the terminal block can be reduced and the number of component parts can be reduced. Generally, when a plate is involved in an insert molding process, a layer of resin is formed on surfaces of the plate. In the foregoing embodiments, the layer of resin is not merely a resin layer, but is a layer that is formed as an anti-vibration portion that has an anti-vibration function, by appropriately setting the layer of resin. Therefore, it should be apparent on the basis of the foregoing technical idea that a resin sheet having high damping capability may be disposed on a surface of the plate in the insert molding process.

What is claimed is:

1. A rotary electric machine terminal block that fits into an opening of a case in which a rotary electric machine is provided, and that is fixed to the case by a presser plate, comprising:
   an electric power line connector that relays electric power to the rotary electric machine;
   a signal line connector that relays a sensor signal for detecting a rotation angle of the rotary electric machine;
   a mount that is formed by disposing the electric power line connector and the signal line connector on the presser plate and performing insert molding so that an anti-vibration plate is formed by a resin on an upper surface of the presser plate;
   a projected portion of the presser plate that is projected radially outward from the mount and that has a fixation hole for fixing the presser plate to the case, wherein the presser plate is made of a metal; and
   an edge seal member provided at a boundary between the anti-vibration plate made of resin and the projected portion exposed from the resin of the mount,
   wherein the mount is a portion of the terminal block formed by simultaneously disposing the presser plate, the electric power line connector and the signal line connector in a die for the insert molding, and injecting a molten resin into the die thereby resulting in formation of the anti-vibration plate; and
   wherein the projected portion of the presser plate is exposed from the resin of the mount.

2. The rotary electric machine terminal block according to claim 1, wherein the presser plate is provided with a face seal member that causes the mount to be tightly attached to the case.

3. The rotary electric machine terminal block according to claim 2, wherein a bottom surface of the presser plate is provided with a support portion for supporting the edge seal member.

4. The rotary electric machine terminal block according to claim 1, wherein the mount has a positioning pin that is formed by the molten resin and that fits into a pin hole that is formed in the case.

5. The rotary electric machine terminal block according to claim 1, wherein the anti-vibration plate is formed on the upper surface of the presser plate so that an outer peripheral portion of the presser plate and the projected portion of the presser plate are exposed.

6. The rotary electric machine terminal block according to claim 1, wherein the presser plate is made of a steel sheet.

7. The rotary electric machine terminal block according to claim 1, wherein:
   a bottom of the presser plate is provided with a support portion; and
   the presser plate is provided with a through hole for connecting the anti-vibration plate and the support portion to an outer peripheral portion of the presser plate.

8. The rotary electric machine terminal block according to claim 1, wherein:

the anti-vibration plate includes a pocket portion at the boundary between the projected portion and the anti-vibration plate, and the edge seal member is fitted into the pocket portion.

* * * * *